United States Patent
Sharman

(10) Patent No.: US 8,358,374 B2
(45) Date of Patent: Jan. 22, 2013

(54) APPARATUS AND METHOD FOR CONVERTING BETWEEN INTERLACED AND PROGRESSIVE SCAN VIDEO

(75) Inventor: Karl James Sharman, Eastleigh (GB)

(73) Assignee: Sony United Kingdom Limited, Weybridge (GB)

( * ) Notice: Subject to any disclaimer, the term of this patent is extended or adjusted under 35 U.S.C. 154(b) by 1408 days.

(21) Appl. No.: 11/911,572

(22) PCT Filed: Oct. 27, 2006

(86) PCT No.: PCT/GB2006/004000
§ 371 (c)(1),
(2), (4) Date: Oct. 15, 2007

(87) PCT Pub. No.: WO2007/051977
PCT Pub. Date: May 10, 2007

(65) Prior Publication Data
US 2008/0192142 A1    Aug. 14, 2008

(30) Foreign Application Priority Data

Oct. 31, 2005   (GB) .................................. 0522203.9

(51) Int. Cl.
*H04N 7/01* (2006.01)
*H04N 11/20* (2006.01)
*G06K 9/48* (2006.01)

(52) U.S. Cl. ........ 348/448; 348/452; 348/699; 348/700; 382/199; 382/300

(58) Field of Classification Search .................. 348/448, 348/452, 699, 700; 382/199, 298, 300
See application file for complete search history.

(56) References Cited

U.S. PATENT DOCUMENTS
5,019,903 A    5/1991   Dougall et al.

FOREIGN PATENT DOCUMENTS
EP    1 271 948    1/2003

OTHER PUBLICATIONS

Thomas, G.,"A Comparison of Motion-compensated Interlace-to-progressive Conversion Methods", Signal Processing Image Communication, vol. 12, No. 3, pp. 209-229, 1998. Li, R. et al.,"Reliable Motion Detection/Compensation for Interlaced Sequences and Its Applications to Deinterlancing", IEEE Transactions on Circuits and Systems for Video Technology, vol. 10, No. 1, pp. 23-29, 2000.
Office Action issued Aug. 28, 2012, in Chinese Patent Application No. 200680037397.5 (with English-language translation).

*Primary Examiner* — Kristine Kincaid
*Assistant Examiner* — Omar S Parra
(74) *Attorney, Agent, or Firm* — Oblon, Spivak, McClelland, Maier & Neustadt, L.L.P.

(57) ABSTRACT

An image processing apparatus generating output image pixels from groups of one or more input image pixels, the groups selected in accordance with an image feature direction in the input image. An interpolator interpolates intermediate pixels between the input image pixels, and a block comparator detects correlation between sets of test blocks of pixels in the input image, which sets are oriented with respect to a current pixel position so that the orientation of a set having the greatest correlation indicates a probable image feature direction applicable to the current pixel position. For at least some sets of test blocks having an orientation with respect to the current pixel position within a predetermined range around a vertical orientation, the test blocks include the input image pixels and intermediate pixels interpolated from the input image pixels. For other sets of test blocks, the test blocks include only the input image pixels.

9 Claims, 13 Drawing Sheets

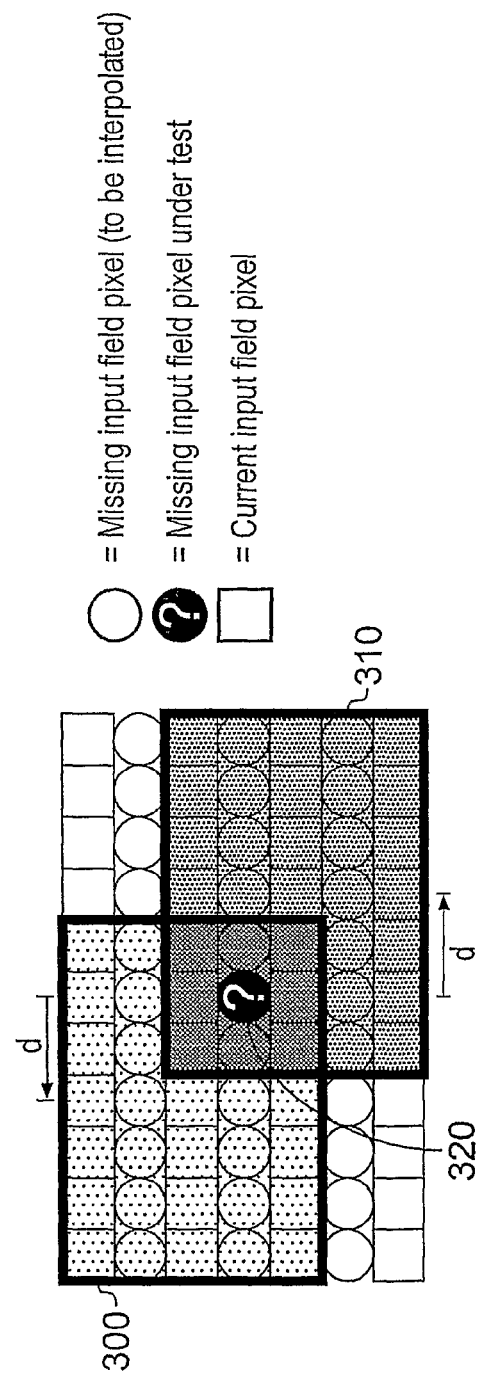
Fig. 5
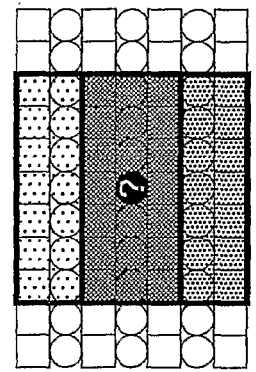
Fig. 6C
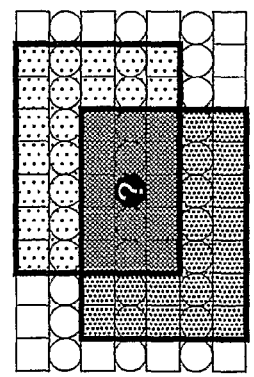
Fig. 6B
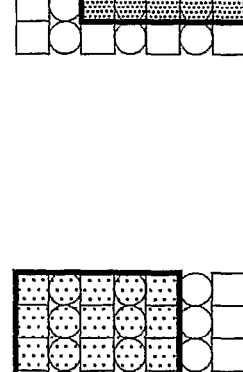
Fig. 6A
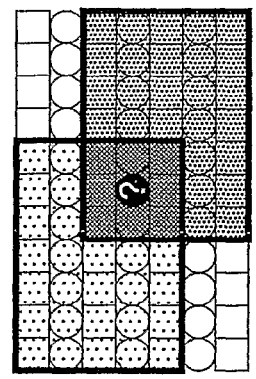
Fig. 6E
Fig. 6D

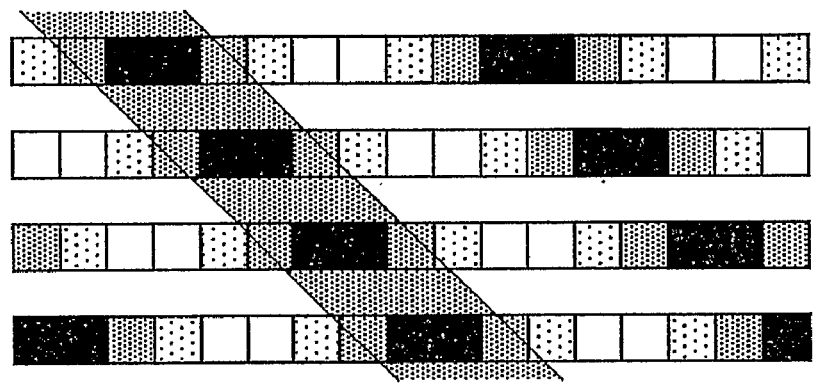
Fig. 8A
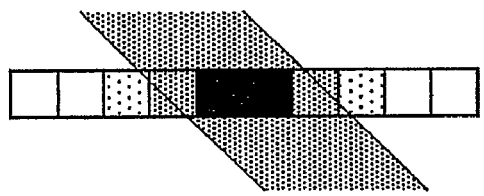
Fig. 8B
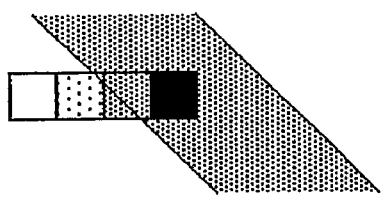 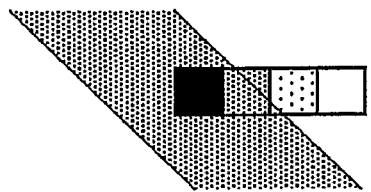
Fig. 8C                    Fig. 8D

APPARATUS AND METHOD FOR CONVERTING BETWEEN INTERLACED AND PROGRESSIVE SCAN VIDEO

This invention relates to image processing.

Video image capture represents a spatial and temporal sampling process. An image is captured as a set of pixels arranged in rows or lines. Successive images are captured at spaced instants in time.

A complication is the common use of interlaced video capture and processing. In an interlaced video signal, each image is handled as two sets or fields of alternate lines of pixels. For example, odd numbered lines might be included in one field, whereas even numbered lines could be included in the next field. An advantage of interlaced techniques is that they give an apparent doubling of the image rate, so reducing flicker effects, for no substantial increase in video signal bandwidth. Interlace gives rise to different spatial sampling frequencies in the horizontal and vertical directions.

If it is desired to convert between interlaced video and progressive scan (non-interlaced) video, then for non-moving images it is merely necessary to interleave two successive fields to recreate a non-interlaced frame having all lines of pixels present. However, if there is any significant inter-field motion, this approach may not work. In such circumstances it can be more appropriate to derive the lines of pixels which are missing in one field from other pixels in that same field. In other words an interpolation process is used.

Because a field may represent an image of an item at any orientation, it is appropriate to select a direction for interpolating a missing pixel in dependence on nearby image material, i.e. to attempt to interpolate in general alignment with a feature of the item. Detection of a suitable interpolation direction can be made using a block matching technique, for example.

This technique can work well for image feature angles which are far from vertical, but in the case of near vertical angles, some lack of accuracy can result.

Figure 4:
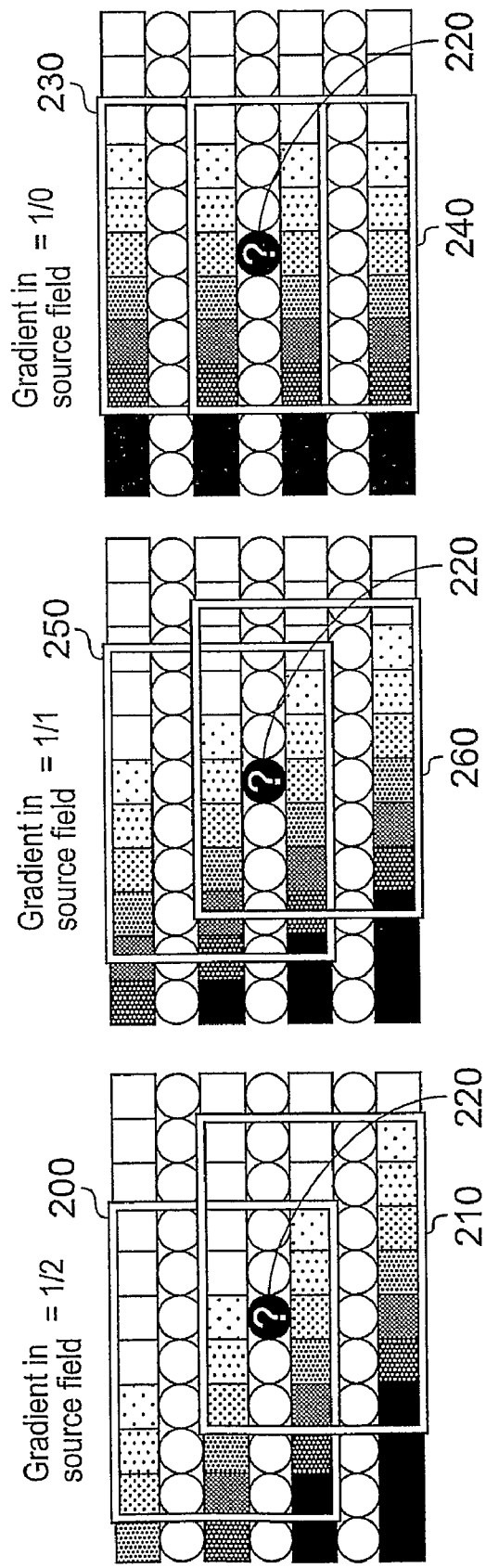

Reference is made to FIGS. 4a to 4c of the accompanying drawings, which will be described in more detail below. The three drawings schematically illustrate an attempt using block matching to detect the angle of an image feature, indicated by differently shaded pixels (squares). The small circles represent missing pixels to be interpolated, and a particular pixel under consideration has a question mark in the circle. It should be noted that in a real system, very many block matching operations may be carried out at different block sizes and displacements, in order to try to identify an image feature angle at a particular pixel position.

The arrangements of FIGS. 4a and 4c are achievable using real pixels. But in order to detect a gradient which is nearer to vertical than that shown in FIG. 4a, block matching needs to take place with fractional-pixel displacements. This simply is not possible with real pixels.

To address this problem, it has been proposed that an image should be up-converted so as to double its number of pixels in the horizontal direction, before block matching for image feature angle detection is applied.

This invention provides image processing apparatus in which pixels of an output image are generated from groups of one or more pixels of an input image, the groups being selected in accordance with an image feature direction in the input image, the apparatus comprising:

an interpolator for interpolating intermediate pixels between pixels of the input image; and a block comparator for detecting correlation between sets of test blocks of pixels in the input image, the sets of test blocks being oriented with respect to a current pixel position so that the orientation of a set having the greatest correlation indicates a probable image feature direction applicable to the current pixel position;

in which:

for at least some sets of test blocks which have an angular orientation with respect to the current pixel position within a predetermined range around a vertical orientation, the test blocks include pixels of the input image and intermediate pixels interpolated from pixels of the input image; and for other sets of test blocks, the test blocks include only pixels of the input image.

The invention recognises that pixel-doubling (or more generally, oversampling) of the type described above can be very useful for detecting image feature angles close to vertical, but it suffers from the disadvantage that an up-converted version of the image must be generated and stored to allow the various block matching tests to be carried out. Storing a double-resolution image can be particularly problematic where the technique is implemented in one or a small number of integrated circuits based on user-programmable logic elements such as application specific integrated circuits (ASICs) or field-programmable gate arrays (FPGAs), as a double-resolution field store requires a relatively very large number of such logic elements.

The invention addresses and alleviates this problem by providing the selective use of a scaled image, recognising that the scaling is more relevant at smaller angular displacements from the vertical. This arrangement allows the scaled pixels to be generated as and when they are needed, so avoiding the need to store an entire scaled image.

Further respective aspects and features of the invention are defined in the appended claims.

Figure 1:
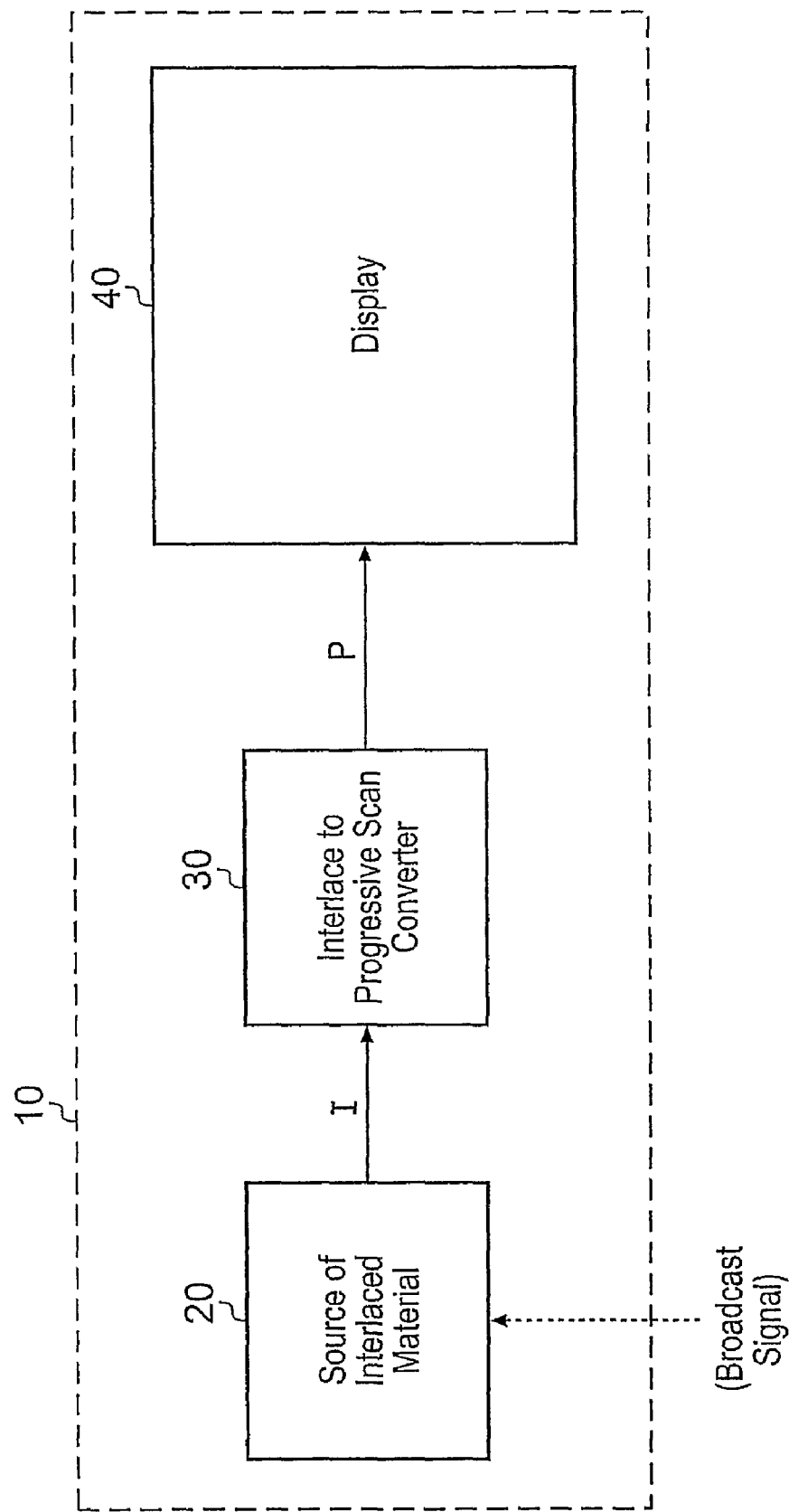
Figure 2:
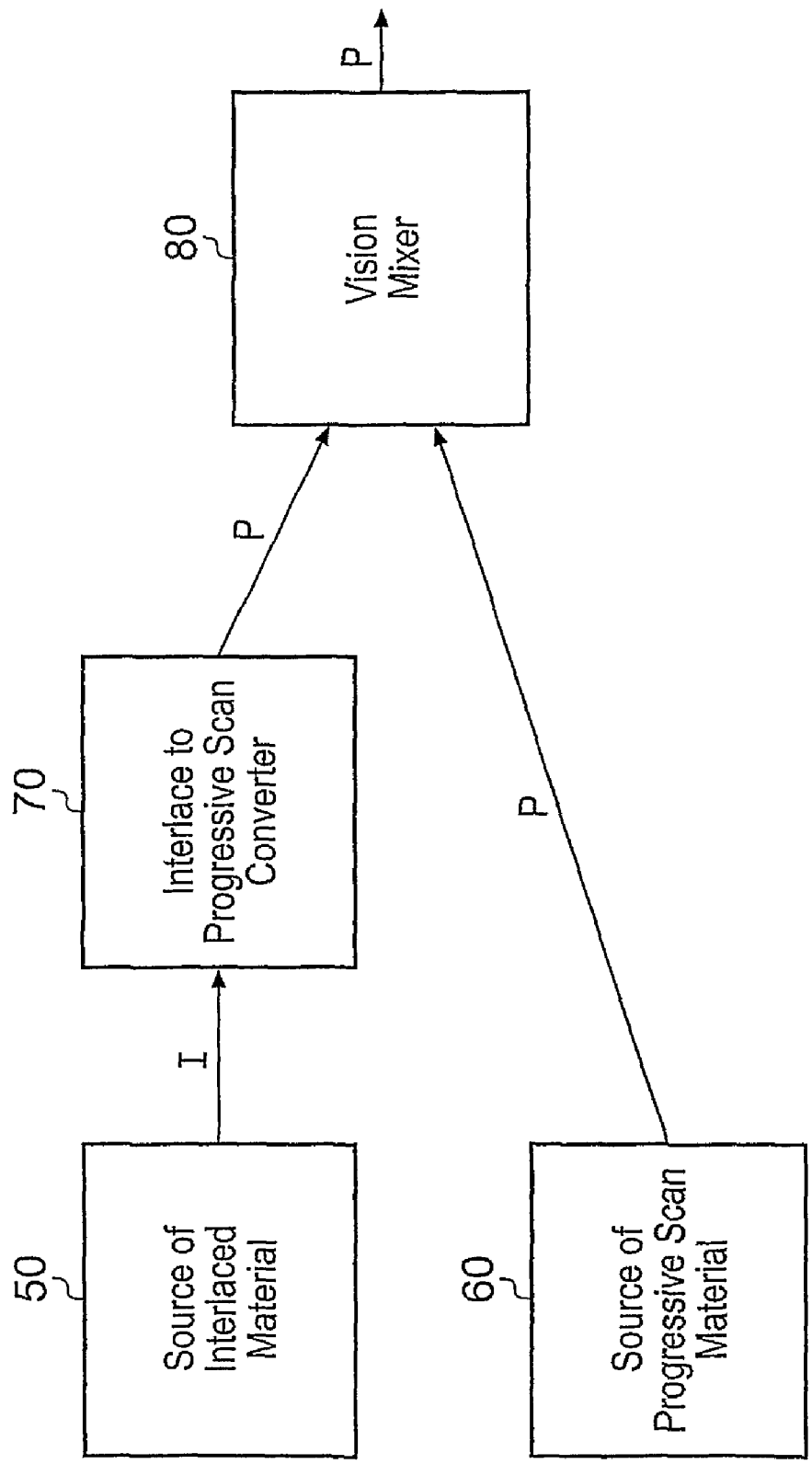
Figure 3:
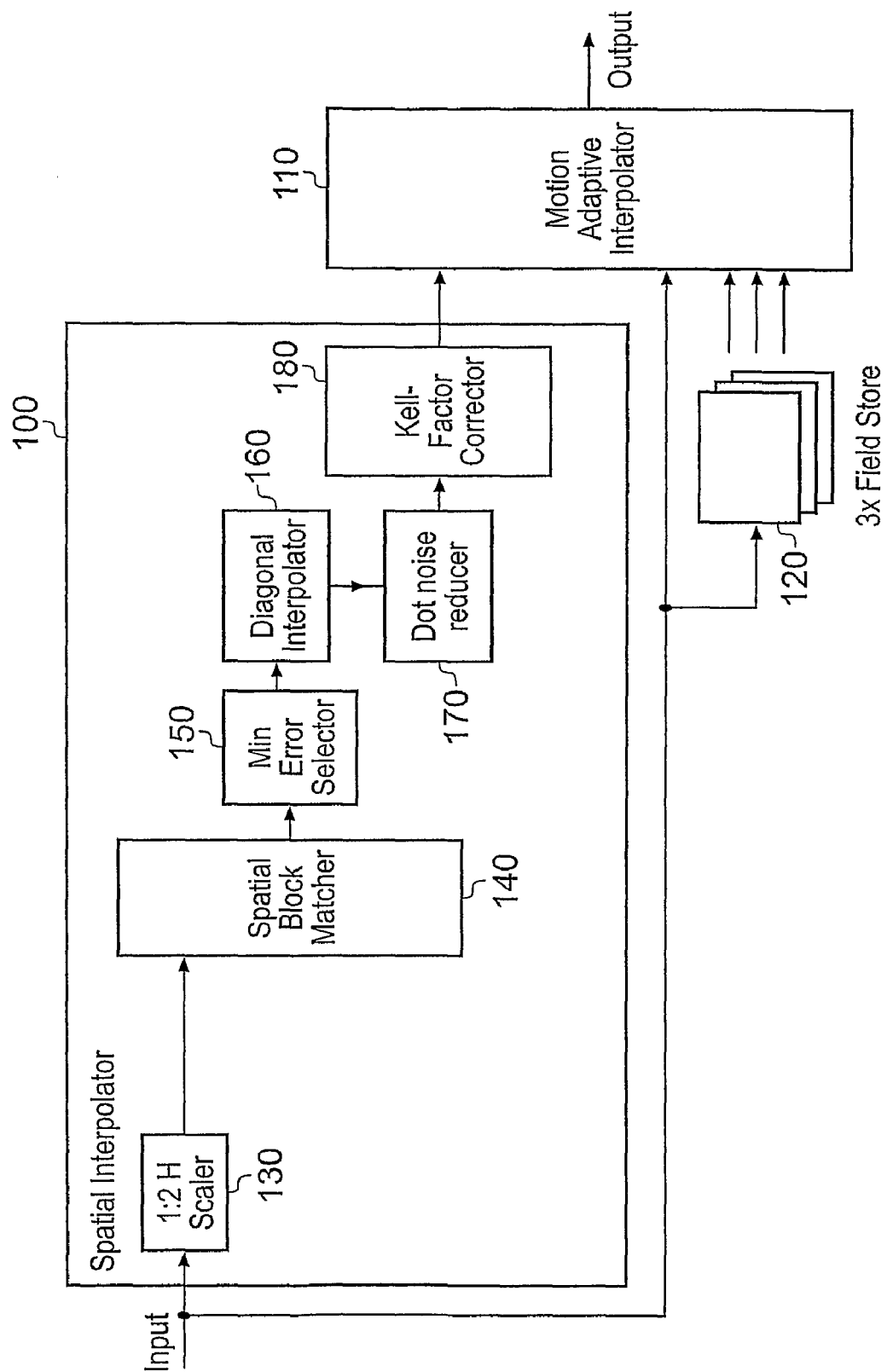
Figure 7A:
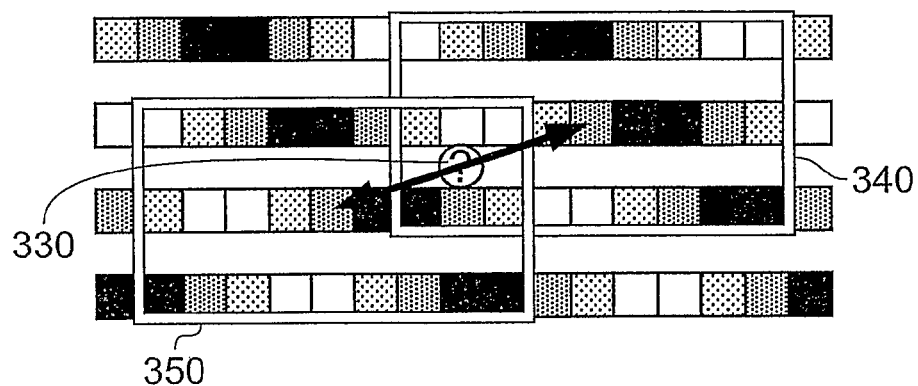
Figure 7B:
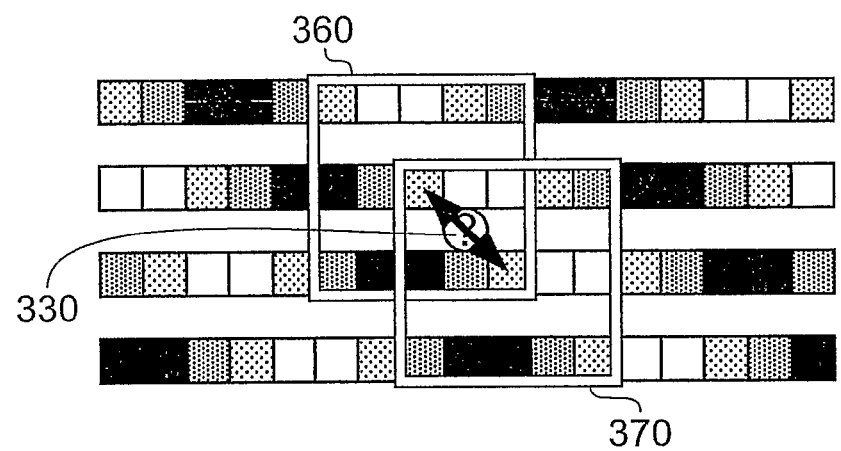
Figure 9:
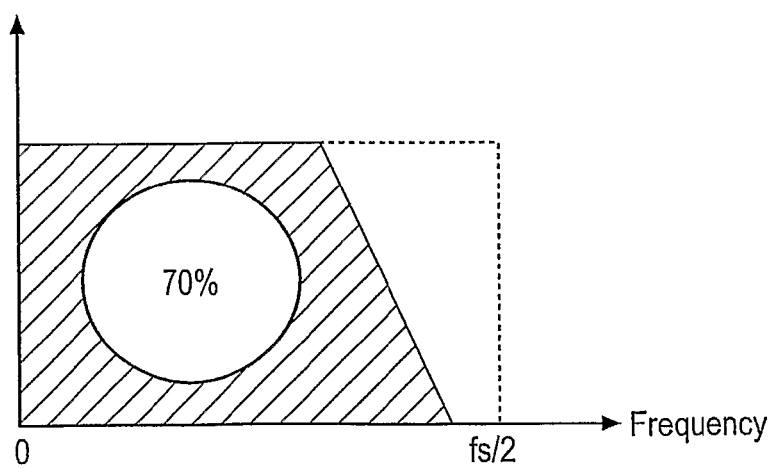
Figure 10:
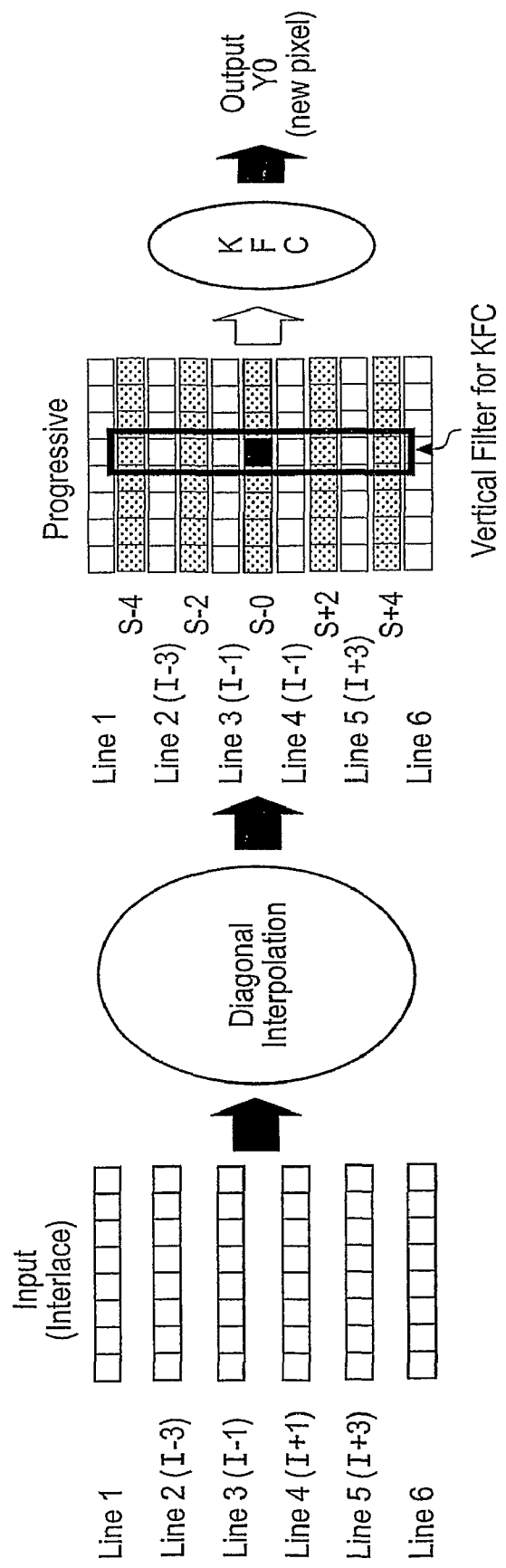
Figure 11:
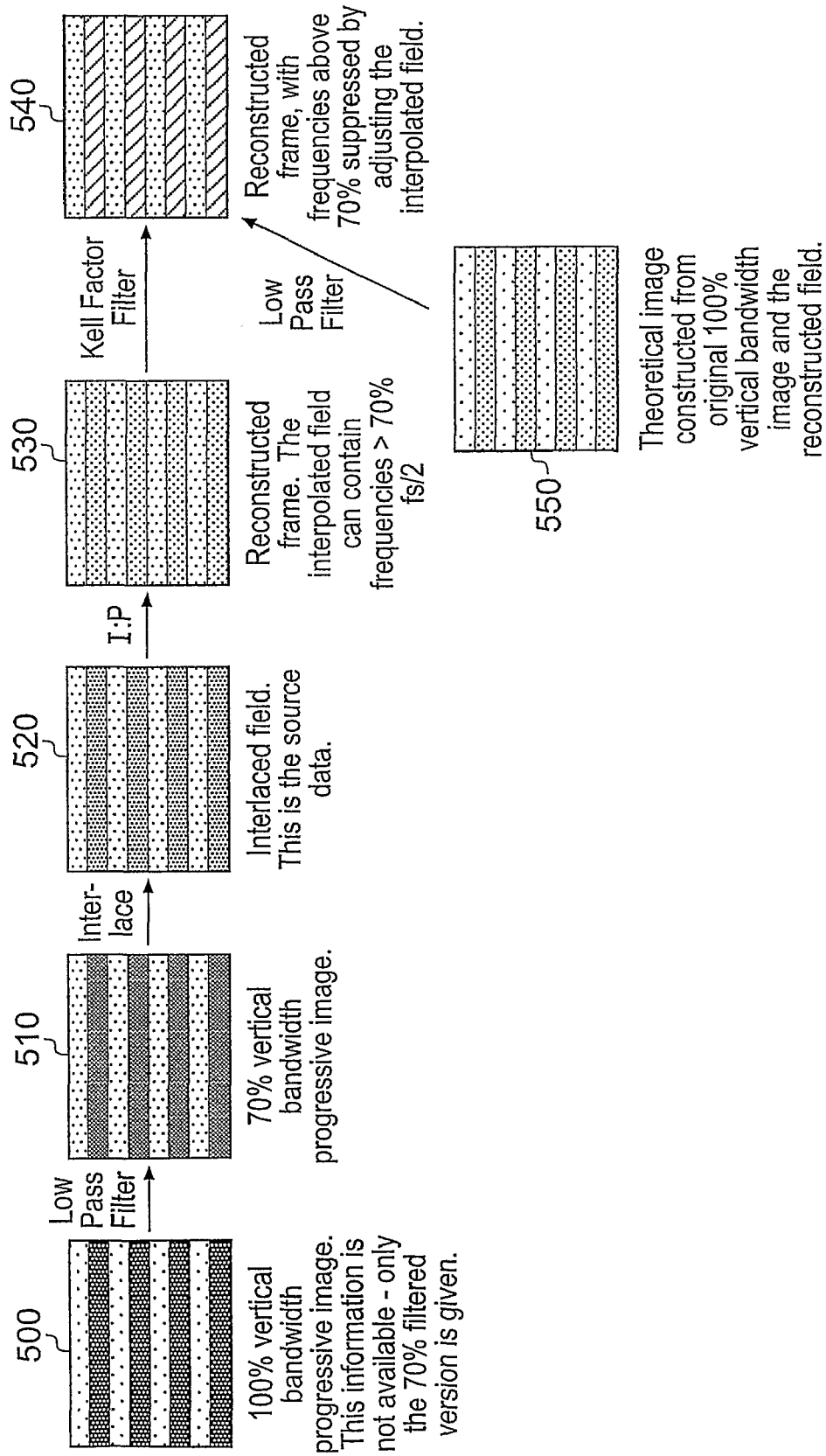
Figure 12A:
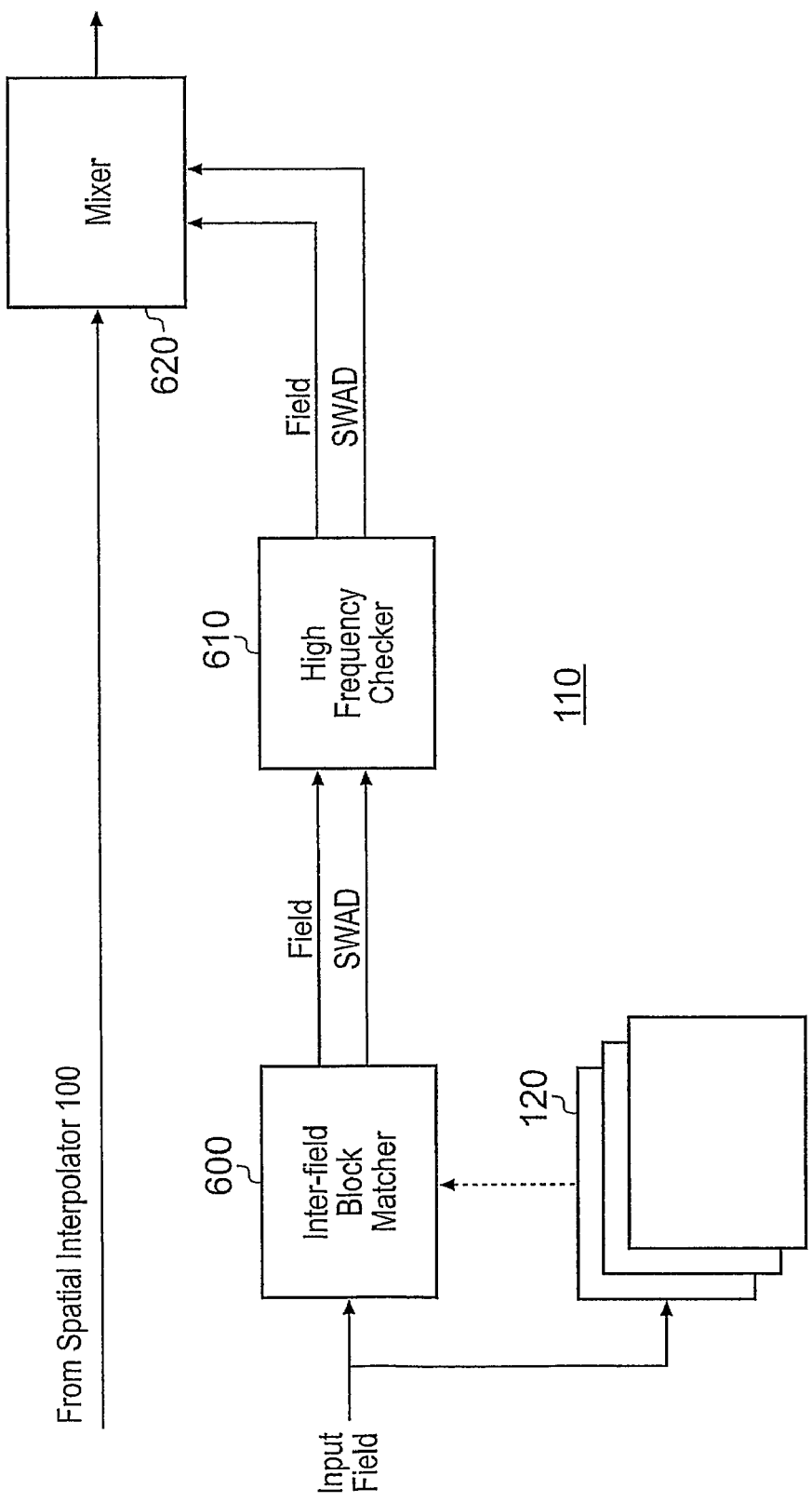
Figure 12B:
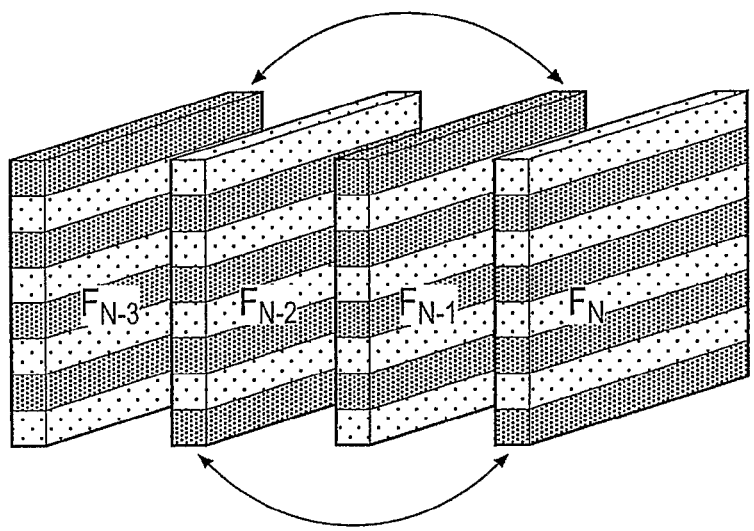
Figure 13:
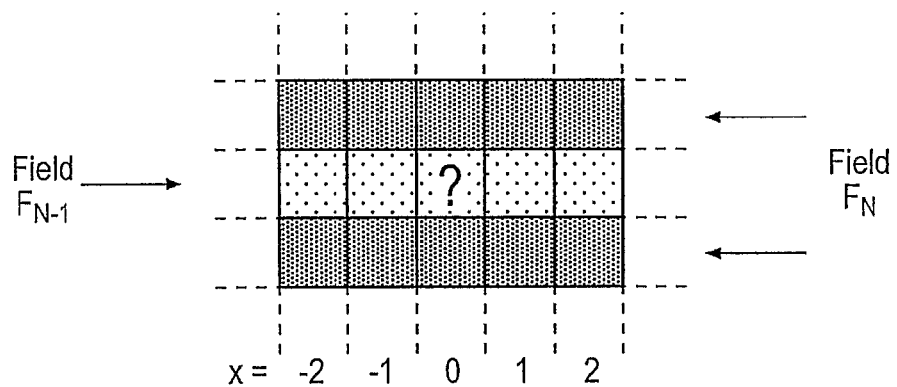
Figure 18:
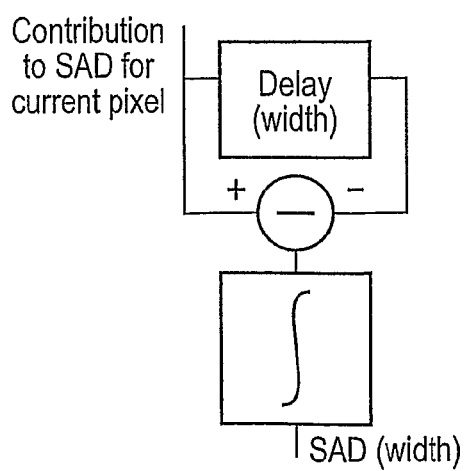
Figures 14A, 14B:
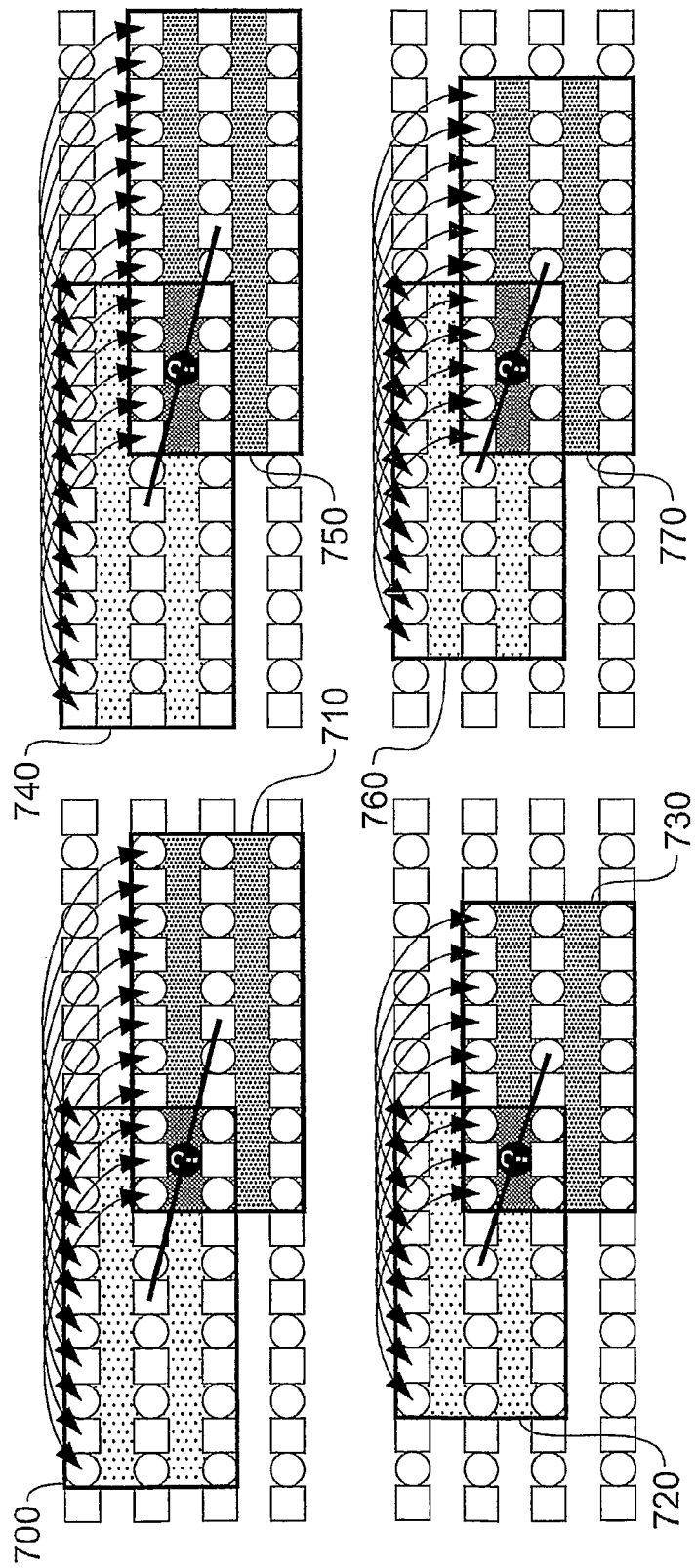

Embodiments of the invention will now be described, by way of example only, with reference to the accompanying drawings in which:

FIG. 1 schematically illustrates a flat-screen display arrangement;

FIG. 2 schematically illustrates video mixing operation in a studio environment;

FIG. 3 schematically illustrates an interlace to progressive converter;

FIGS. 4a to 4c schematically illustrate gradient detection;

FIGS. 5 and 6a to 6e schematically illustrate a spatial block matching operation;

FIGS. 7a and 7b schematically illustrate an alias situation;

FIGS. 8a to 8d schematically illustrate alias detection techniques;

FIG. 9 schematically illustrates a Kell-factor filtering operation;

FIGS. 10 and 11 schematically illustrate stages in a Kell-factor filtering operation;

FIG. 12a schematically illustrates a motion adaptive interpolator;

FIG. 12b schematically illustrates motion detection between successive video fields;

FIG. 13 schematically illustrates a high frequency check operation;

FIGS. 14a and 14b schematically illustrates a variation which reduces the need for image scaling;

FIGS. 15, 16a, 16b, 17a and 17b schematically illustrate a primary and an alternative pixel testing strategy; and FIG. 18 schematically illustrates the generation of a difference value.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

FIG. 2 schematically illustrates a video mixing operation in a studio environment, in order to give another example of the use of interlace to progressive scan conversion. Here, a source of interlace material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

FIG. 3 schematically shows an interlace to progressive scan converter. In general terms, the converter comprises a spatial interpolator 100, a motion adaptive interpolator 110 and a set of three field stores 120.

The converter of FIG. 3 operates to generate output progressive scan frames at the same repetition frequency as the input interlaced fields. Therefore, a main requirement of the converter is to generate the "missing" pixels in each interlaced field to turn that interlaced field into a progressive scan frame. This can be achieved in one of two ways. On one hand, the spatial interpolator 100 generates the "missing" pixels by spatial interpolation within the field concerned. In other words, this is an intra-field operation. On the other hand, the motion adaptive interpolator generates the missing pixels by inserting pixels from an adjacent field of the opposite polarity. This is valid only if there is no image motion between the fields, so the basic organisation of FIG. 3 is that the output of the spatial interpolator 100 is used at image positions where image motion is detected, while the output of the motion adaptive interpolator 110 is used at pixel positions where image motion is not detected. For simplicity of operation, the spatial interpolator operates at each pixel position, and the motion adaptive interpolator either selects the output of the spatial interpolator, or selects a pixel from another field of the opposite polarity for output, or mixes the two.

The motion adaptive interpolator will be described in more detail below. First, the spatial interpolator will be described.

The spatial interpolator comprises a 1-2 horizontal pixel scaler 130, a spatial block matcher 140, a minimum error selector 150, a diagonal interpolator 160, a dot noise reducer 170 and a Kell-factor corrector 180. The operation of each of these will be described in more detail below.

The scaler 130 uses horizontal linear interpolation to generate one additional pixel value between each two pixels of the input interlaced field. So, the horizontal resolution (at least in terms of number of available pixel values) is doubled, but no difference is made at this stage to the vertical resolution.

The reason why horizontal scaling is appropriate will be described with reference to FIGS. 4A to 4C.

As will be described below, the overall operation of the spatial block matcher 140 and the diagonal interpolator 160 is to detect the orientation of an image feature relevant to a pixel position where a new pixel is to be interpolated, and then to apply an interpolation along that image feature direction. So, if a current pixel position to be interpolated lies within a diagonal image feature (a line, an edge etc.) at, say, 45° to the horizontal, interpolation of that new pixel would take place along that 45° direction. This can tend to give a better output result than restricting the interpolation to horizontal or vertical interpolation. A key part of this process, clearly, is therefore to detect the direction of an image feature at each pixel position.

This detection is carried out using a block matching process. The actual block matching process will be described in much more detail below. But at this stage, FIG. 4A schematically illustrates a successful block match between two blocks 200, 210 of pixels around the position of an unknown pixel 220 (a circle with a question mark inside). Indeed, the notation used in the present drawings is that a square indicates a known pixel where as a circle indicates a pixel to be interpolated by the diagonal interpolator 160. The shading in FIGS. 4A to 4C is a schematic representation of an image feature.

So, referring to FIG. 4A, a successful block match is obtained between the blocks 200, 210 around the unknown pixel position 220, indicating a gradient of an image feature of 1/2.

Turning now to FIG. 4C, an image feature is vertical and there is again a successful block match between overlapping blocks 230, 240.

However, in FIG. 4B, the image feature has a gradient of 1/1. It is not possible to obtain a successful block match with the blocks at integral pixel positions. A successful match between blocks 250, 260 occurs at a half integral pixel position. Accordingly, in order to detect gradients of this nature (indeed any gradients sharper than 1/2), it is necessary to operate at a sub-pixel accuracy. In the present case, a half-pixel accuracy was adopted. If a greater accuracy still was used, (e.g. quarter-pixel accuracy) then gradients yet closer to vertical could be detected. In this embodiment, half-pixel accuracy was selected as a balance between processing requirements and accuracy at very acute gradients.

In fact, in embodiments of the invention to be described below, not all of the image is subjected to 1:2 scaling by the scaler 130 at any one stage. This selective use of scaling will be described in more detail below.

FIGS. 5 and 6A to 6E schematically illustrate the spatial block matching operation.

As noted above, spatial block matching is carried out at sub-pixel accuracy; in this case half-pixel accuracy.

A range of block sizes is used, with corresponding search ranges (maximum displacements relative to the pixel position under test). Taking into account the 1:2 scaling operation, example block sizes and search ranges are given in the following table:

| Block Size<br>(in scaled pixels) | Search Range<br>(in scaled pixels) |
|---|---|
| 3v × 3h | 0h |
| 3v × 5h | ±1h |
| 3v × 7h | ±2h |
| ... | ... |
| 3v × 41h | ±19h |

FIG. 5 schematically illustrates a block match operation between two blocks of 3v×7h pixels 300, 310, around an unknown pixel position 320. The variable d signifies a horizontal displacement of the block's horizontal centre from the pixel position under test. A condition applied to the block matches is that the blocks must always overlap the pixel position under test. Also, the blocks are displaced in integral numbers of real pixel displacements (so a displacement of m corresponds to a displacement of 2m interpolated pixels). Accordingly, the particular block size shown in FIG. 5 allows five possible tests at a displacement of −2 pixels (FIG. 6A) −1 pixel (FIG. 6B), 0 pixels (FIG. 6C), +1 pixel (FIG. 6D), and +2 pixels (FIG. 6E).

Note that the displacement is indicated as a displacement from the centre, in scaled pixels. The two blocks are displaced by equal amounts, though in opposite directions. Symmetrical displacements are used because otherwise the block matching could detect lines or edges which are not relevant to the pixel under test.

A sum of absolute differences (SAD) is calculated for each block match. This is defined as:

$$SAD(x, y, d, n) = \sum_{dx=-n}^{n} \sum_{dy=-3,-1,1} \sum_{RGB/YCbCr} |p(x-d+dx, y+dy) - p(x+d+dx, y+dy+2)|$$

where x, y represent the current pixel co-ordinate (y being a frame line number), d is the displacement being tested, and n is the radius of the block (the block width is n'=2n+1).

In general terms, the SAD values for three colour components (red, green and blue) are combined, and a minimum normalised SAD value determines a gradient for interpolation. Various checks are made to avoid poor interpolation, as described below.

Measures are taken to avoid problems caused by alias situations. FIGS. 7A and 7B illustrate a possible alias situation.

Referring to FIG. 7A, a block match between blocks 340 and 350 suggests that an unknown pixel 330 should be a dark grey colour. Here, the block match is 100% successful and so the SAD value would be zero (note that this is a schematic example!)

However, in FIG. 7B, a block match between blocks 360 and 370 is also 100% successful, again giving a SAD value of zero. The block match of FIG. 7B suggests that the unknown pixel 330 should be a light grey colour.

This conflict of block match results is a product of aliasing between the closely spaced diagonal image features in the image portions shown in FIGS. 7A and 7B. While it may at first appear that either diagonal line is equally valid (i.e. a steep diagonal line from upper left to lower right or a more gentle diagonal line from upper right to lower left) is valid, a processing rule has been set up to allow an appropriate selection to be made. This rule will now be described.

The basis of the rule is that the block match process is restricted to that only areas considered to be "line segments" are detected. That is to say, each block in a block match should contain a line segment.

A digitised line segment is considered to have two properties. Firstly, it is monotonic along the central scan line row of the block in question, and secondly there is a vertical transition between scan lines in the block in question. The way in which these tests are applied will be described with reference to FIGS. 8A to 8D.

In FIG. 8A, a source field contains multiple diagonal lines. FIG. 8B schematically illustrates one row of pixels within the image of FIG. 8A. FIGS. 8C and 8D illustrate the two edges of the diagonal line shown in FIG. 8B. It will be seen that each of these edges has a region of pixels which show a monotonic variation in luminance. Also, referring back to FIG. 8A, it can be seen that such segments exhibit a vertical transition between adjacent rows of pixels.

So, turning back to FIGS. 7A and 7B, the block match of FIG. 7A would be rejected in favour of the block match of FIG. 7B according to the rule described above. This is because the central line of pixels of the two blocks of FIG. 7B shows a monotonic variation in luminance, whereas the centre line of pixels of the blocks 340, 350 in FIG. 7A does not.

In fact, the rule is not expressed in such stark terms. The actual rule involves a balance between the various properties of the line as follows:

$$\text{Monotonicity} = \sum_{y=-1}^{0} \left\{ \left( \sum_{i=2}^{blockWidth} |x(i, y) - x(i-1, y)| \right) - |x(blockWidth, y) - x(1, y)| \right\}$$

$$\text{Average Vertical Energy} = \frac{\left( \sum_{i=1}^{blockWidth} |x(i, 0) - x(i, -1)| \right)}{blockWidth}$$

The rule is that:

Monotonicity+C1+(C2/blockwidth)<Average vertical energy where C1, C2 are constants which allow for noise in the data. If this condition is met, the relevant block match is used as a valid interpolation direction.

Note that the tests are performed separately in respect of each of the colour components (e.g. R, G and B). All three tests must be passed separately. Alternatively, for example to save hardware, fewer than three tests could be performed. For example, only the luminance, or only one colour component, might be tested. Of course, a YCbCr or YPbPr representation could be tested instead.

A second rule, hinted at above, which is applied to block matching is that the minimum normalised SAD value determines the gradient for subsequent interpolation.

Normally, the direction is selected from the block match with the smallest error (smallest normalised SAD). In such cases, the Kell-factor correction of the corrector 180 will not later be used if the normalised SAD is less than a threshold $KFC_{thresh}$.

However, if the normalised SAD value is similar (within a threshold amount) for multiple block offsets or if the smallest normalised SAD value obtained across all of the block matches is greater than a predetermined maximum value, then vertical interpolation will be used, Kell-factor correction will always be used in these cases and the normalised SAD value is set to the predetermined maximum value mentioned above.

A third rule applicable to block matching is as follows.

The basis of the rule is that neighbouring 'unknown' (to be interpolated) pixels should indicate a similar gradient to a current pixel under consideration.

For the current 'unknown' pixel, let G be the predicted gradient. Let the search range be |G|/4+1 (the division is necessary since 'G' is in terms of scaled pixels). Let C3 ... be programmable constants To apply the rule, examine all pixels in the current missing line at positions from −search range to +search range (inclusive) relative to the current pixel. Each predicted gradient, g, in that range that satisfies the following inequality increments a value 'counter':

$$(|G|-d) <= C3(g-G) <= (|G|+d)$$

Then, if counter*C4<C5*(2×range+1), let v be the original value and v' be the vertically interpolated value, and set the result to C6 v'+(1−C6)v (preferred version) or C6 v'+C7v (more general version). Increment the normalised SAD score for the pixel by C8, which constant can be set to encourage the use of the KFC.

The diagonal interpolator 160 is a simple pixel averager: given a direction it picks the pixel in that direction on the line below and the pixel in that direction on the line above and averages them.

The dot noise reducer 170 involves a process which is applied to the output of the diagonal interpolator 160. A test is applied to detect whether an interpolated pixel lies within the maximum and minimum values of the four vertically and horizontally pixels, i.e. the pixels immediately above, below, left and right of the interpolated pixel. Note that the pixels above and below the interpolated pixel will be real pixels, whereas those to the left and right will be interpolated themselves.

If the interpolated pixel does not lie within this range, then;

Let v be the original value of the pixel under consideration, and let v' be v, clipped to lie within the range of the four locally neighbouring pixels.

Let the new pixel value be kDNR v'+(1−kDNR)v, where kDNR is programmable.

The operation of the Kell-factor corrector 180 will now be described with reference to FIGS. 9 to 11.

Kell-Factor Correction

In the present discussion, references to the Kell-factor are simply to help explain the operation of this part of the system. What the filter is actually exploiting is simply the knowledge that the source image did not use the full bandwidth available to it, whether that is because of scanning artefacts or because of a low pass filtering process.

The Kell-factor is a quantity which represents a property of progressive scan and interlaced images. In order to represent the information being scanned, it is generally considered that only 70% (the Kell-factor) of the possible vertical bandwidth is (or should be) represented. Hence when performing an interlace to progressive scan conversion, it is potentially hazardous to attempt to produce a full vertical bandwidth image. Instead, a compensation to account for a Kell-factor of less than unity may be used.

One method to compensate for the Kell-factor would be to use a 70% bandwidth filter on the frame output of any interlace to progressive scan algorithm. However, one of the fields in the frame is 'real' data—i.e. it was sampled correctly, so the content arising from that field must by definition be perfect. Thus a method to filter just the interpolated lines is used.

A generic Kell-factor filtering operation is schematically illustrated in FIG. 9.

The following mathematics and algorithm describe a filter suitable for performing a 70% bandwidth filter on interpolated lines. In empirical tests the filter has been found to significantly reduce artefacts, and it is important to note that the results are also significantly better than simply performing a 1:2 vertical up-scaling operation on the input interlaced video.

FIGS. 10 and 11 schematically demonstrate the concept. The general idea is shown in FIG. 10, whereby a vertical filter is (selectively) applied to real pixels I and interpolated pixels S in a progressive scan frame.

To explain the technique it will be useful to consider some data which does not exist—in particular, the missing lines of an interlaced field. By treating these lines (for part of the derivation) as though they do exist, filter techniques can be derived to apply to the interpolated versions of those lines so as to generate an approximation to a filtered version of the missing lines. This will become clear from the following explanation.

Referring to FIG. 11, a hypothetical 100% vertical bandwidth progressive image 500 is considered. This does not of course exist; at best it would be 70% filtered, due to the inherent filtering in the sampling process. This forms a realisable progressive frame 510. However, even this frame is not available to us; instead, it is provided in interlaced form as a field 520. The field 520 is the source data to the present interlace to progressive scan conversion process.

The interlaced field 520 is supplied to an interlace-to-progressive converter, which then generates the missing field lines to produce a reconstructed frame 530. However, the frame 530 may now contain frequencies that are above 70% of the available bandwidth. Generating such frequencies is not always desired, since the information was not present in the source data to the interlace to progressive scan converter. Hence a version 540 of this frame that does not exceed this bandwidth limit should be created, and this should be achieved by adjusting just the reconstructed field lines and not the source field lines—those source field lines are from an image that has already been passed through such a filter, and are therefore 'perfect'.

Producing the required output can therefore be thought of as the low-pass filter output of a theoretical image 550 constructed from the lines from the original 100% vertical bandwidth image interlaced with the reconstructed field. However, the original 100% vertical bandwidth image is not available, and so a technique to circumvent this problem is now described.

A 3-Tap Source Filter Method

This is the first of the three methods to create a suitable filter; only the latter two methods are recommended, and this method is included in the present description to show progression.

Consider a 3 tap low-pass symmetrical filter of the form $$\text{filter} = \begin{bmatrix} a \\ b \\ a \end{bmatrix}$$

and also a column of pixels, P, from five lines of video that has been converted from interlace to progressive scan:

$$input = \begin{bmatrix} P_{-2} \\ P_{-1} \\ P_0 \\ P_1 \\ P_2 \end{bmatrix} = \begin{bmatrix} I_{-2} \\ F_{-1} \\ I_0 \\ F_1 \\ I_2 \end{bmatrix}$$

where F are pixels from a real field of data, and I are interpolated pixels. Note that these values are known.

The real field pixels, F, must be output from the system. These have already been filtered according to the Kell-factor during the recording of the video. Hence consider the raw video prior to the filtering—this is a conceptual video source, since the actual Kell-factor filter would be intrinsic in the sampling of the optical information. Let this raw, or pseudo input video be described as:

$$pseudoInput = \begin{bmatrix} I_{-2} \\ x_{-1} \\ I_0 \\ x_1 \\ I_2 \end{bmatrix}$$

where x are unknown values from the conceptual 100% vertical bandwidth source, and the I are pixels that have been spatially interpolated, and output=pseudoInput*filter Let us now consider output pixel, $y_0$, which is vertically aligned with pseudo input pixel $I_0$.

$$\begin{bmatrix} \vdots \\ y \\ \vdots \end{bmatrix} = \begin{bmatrix} \vdots \\ I_{-2} \\ x_{-1} \\ I_0 \\ x_1 \\ I_2 \\ \vdots \end{bmatrix} * \begin{bmatrix} a \\ b \\ a \end{bmatrix} = \begin{bmatrix} \vdots \\ ax_{-3} + bI_{-2} + ax_{-1} \\ aI_{-2} + bx_{-1} + aI_0 \\ ax_{-1} + bI_0 + ax_1 \\ aI_0 + bx_1 + aI_2 \\ ax_1 + bI_2 + ax_3 \\ \vdots \end{bmatrix}$$

We do not know the value of $x_{-1}$ and $x_1$, and thus the value of the output pixel, $y_0$, is not immediately known. However, we know that $y_{-1} = F_{-1}$ and $y_1 = F_1$, since the output field lines for the current field are known.

Thus $x_{-1}$ and $x_1$ can be found, and subsequently so can $y_0$:

$$x_{-1} = \frac{1}{b}(y_{-1} - a(I_{-2} + I_0)) = \frac{1}{b}(F_{-1} - a(I_{-2} + I_0))$$

$$x_1 = \frac{1}{b}(y_1 - a(I_0 + I_2)) = \frac{1}{b}(F_1 - a(I_0 + I_2))$$

$$y_0 = a(x_{-1} + x_1) + bI_0$$

$$y_0 = \begin{bmatrix} -a^2/b \\ a/b \\ b - 2a^2/b \\ -a/b \\ -a^2/b \end{bmatrix} \cdot \begin{bmatrix} I_{-2} \\ F_{-1} \\ I_0 \\ F_1 \\ I_2 \end{bmatrix} = \begin{bmatrix} -a^2/b \\ a/b \\ b - 2a^2/b \\ a/b \\ -a^2/b \end{bmatrix} \cdot \begin{bmatrix} P_{-2} \\ P_{-1} \\ P_0 \\ P_1 \\ P_2 \end{bmatrix}$$

Now, a suitable 70% vertical bandwidth filter is given by the vector:

$$vFilter3Tap70pcnt = \frac{1}{32768} \begin{bmatrix} 5138 \\ 22492 \\ 5138 \end{bmatrix}$$

Hence a=5138 and b=22492. Thus:

$$y_0 = \begin{cases} \begin{bmatrix} P_{-2} \\ P_{-1} \\ P_0 \\ P_1 \\ P_2 \end{bmatrix} * \begin{bmatrix} -1174 \\ 7485 \\ 20145 \\ 7485 \\ -1174 \end{bmatrix} & \text{for } P_0 \text{ aligned to interpolated lines} \\ P_0 & \text{otherwise} \end{cases}$$

Hence the problem is actually solved using a 5-tap filter.

A 5-Tap Source Filter Method

The initial symmetrical 3-tap filter has relatively poor filtering characteristics, and thus a method to improve upon this by using an initial symmetrical 5-tap filter was developed.

However, this method also requires the use of the 3-tap filter, otherwise the problem does not have a solution.

Let the symmetrical 5 tap filter consist of three coefficients: a, b, c, and the full filter be described by $[a, b, c, b, a]^T$.

Similarly, let the 3 tap filter consist of two coefficients: d, e, and the full filter be described by $[d, e, d]^T$.

From before, but extending to use the 5-tap filter, $$\begin{bmatrix} \vdots \\ y \\ \vdots \end{bmatrix} = \begin{bmatrix} \vdots \\ I_{-2} \\ x_{-1} \\ I_0 \\ x_1 \\ I_2 \\ \vdots \end{bmatrix} * \begin{bmatrix} a \\ b \\ a \end{bmatrix} = \begin{bmatrix} \vdots \\ aI_{-4} + bx_{-3} + cI_{-2} + dx_{-1} + eI_0 \\ ax_{-3} + bI_{-2} + cx_{-1} + dI_0 + ex_1 \\ aI_{-2} + bx_{-1} + cI_0 + dx_1 + eI_2 \\ ax_{-1} + bI_0 + cx_1 + dI_2 + ex_3 \\ aI_0 + bx_1 + cI_2 + dx_3 + eI_4 \\ \vdots \end{bmatrix}$$

If we attempt to solve this using the same method as before, the problem requires solving a set of simultaneous equations with as many unknowns as half the height of the image. This would thus not be suitable for a sensible hardware design.

Instead, considering the predicted form of the filter, it is likely that the results from the more distant neighbours have a reduced effect on the output than the immediate neighbours of $y_0$: standard low-pass filters have this form of heavy weighting around the central tap. Therefore, when considering a pixel $y_0$, the result from the central tap and the immediate neighbours can be considered to be formed from a 5-tap filter, and the more distant results from a 3-tap filter. Hence the following equation:

$$\begin{bmatrix} \vdots \\ y_{-1} \\ y_0 \\ y_1 \\ \vdots \end{bmatrix} = \begin{bmatrix} \vdots \\ F_{-1} \\ y_0 \\ F_1 \\ \vdots \end{bmatrix} = \begin{bmatrix} \vdots \\ dI_{-2} + ex_{-1} + dI_0 \\ aI_{-2} + bx_{-1} + cI_0 + bx_1 + aI_2 \\ dI_0 + ex_1 + dI_2 \\ \vdots \end{bmatrix}$$

We can now solve for $y_0$, eliminating the unknown 'x's:

$$x_{-1} = \frac{F_{-1} - dI_{-2} - dI_0}{e}$$

$$x_1 = \frac{F_1 - dI_0 - dI_2}{e}$$

$$\begin{aligned} y_0 &= aI_{-2} + bx_{-1} + cI_0 + bx_1 + aI_2 \\ &= \left(a - \frac{bd}{e}\right)I_{-2} + \frac{b}{e}F_{-1} + \left(c - 2\frac{bd}{e}\right)I_0 + \frac{b}{e}F_1 + \left(a - \frac{bd}{e}\right)I_2 \end{aligned}$$

An example 70% 5 tap filter is:

$$vFilter5Tap70pcnt = \frac{1}{32768}\begin{bmatrix} -4006 \\ 8486 \\ 23808 \\ 8486 \\ -4006 \end{bmatrix} = \begin{bmatrix} a \\ b \\ c \\ b \\ a \end{bmatrix}$$

The example 3-tap filter defined above is:

$$vFilter3Tap70pcnt = \frac{1}{32768}\begin{bmatrix} 5138 \\ 22492 \\ 5138 \end{bmatrix} = \begin{bmatrix} d \\ e \\ d \end{bmatrix}$$

Hence the output pixel $y_0$ can be calculated using the following matrix:

$$y_0 = \frac{1}{32768}\begin{bmatrix} I_{-2} \\ F_{-1} \\ I_0 \\ F_1 \\ I_2 \end{bmatrix} \cdot \begin{bmatrix} -5945 \\ 12363 \\ 19930 + 2 \\ 12363 \\ -5945 \end{bmatrix}$$

where the +2 is used to ensure there is unity DC gain (this is required due to rounding errors).

A 7-Tap Source Filter Method

Similar to the 5-tap method, the 7-tap method requires the use of a 7-tap filter, a 5-tap filter and a 3-tap filter.

Let the symmetrical 7 tap filter consist of four coefficients: a, b, c, d, and the full filter be described by $[a, b, c, d, c, b, a]^T$.

Similarly, let the 5 tap filter consist of three coefficients: e, f, g, and the full filter be described by $[e,f,g,f,e]^T$.

Finally, let the 3 tap filter consist of two coefficients j, k, and the full filter by described by $[j, k, j]^T$.

Let us now consider the output pixel $y_0$, and its neighbours:

$$\begin{bmatrix} \vdots \\ y_0 \\ \vdots \end{bmatrix} = \begin{bmatrix} aI_{-6} + bx_{-5} + cI_{-4} + dx_{-3} + cI_{-2} + bx_{-1} + aI_0 \\ ax_{-5} + bI_{-4} + cx_{-3} + dI_{-2} + cx_{-1} + bI_0 + ax_1 \\ aI_{-4} + bx_{-3} + cI_{-2} + dx_{-1} + cI_0 + bx_1 + aI_2 \\ ax_{-3} + bI_{-2} + cx_{-1} + dI_0 + cx_1 + bI_2 + ax_3 \\ aI_{-2} + bx_{-1} + cI_0 + dx_1 + cI_2 + bx_3 + aI_4 \\ ax_{-1} + bI_0 + cx_1 + dI_2 + cx_3 + bI_4 + ax_5 \\ aI_0 + bx_1 + cI_2 + dx_3 + cI_4 + bx_5 + aI_6 \\ \vdots \end{bmatrix}$$

Again, this is not practical to solve, and thus we shall solve this using a combination of a 7-tap, 5-tap and 3-tap filter:

$$\begin{bmatrix} \vdots \\ y_{-3} \\ y_{-2} \\ y_{-1} \\ y_0 \\ y_1 \\ y_2 \\ y_3 \\ \vdots \end{bmatrix} = \begin{bmatrix} \vdots \\ F_{-3} \\ y_{-2} \\ F_{-1} \\ y_0 \\ F_1 \\ y_2 \\ F_3 \\ \vdots \end{bmatrix} = \begin{bmatrix} 0 \\ jI_{-4} + kx_{-3} + jI_{-2} \\ eI_{-4} + fx_{-3} + gI_{-2} + fx_{-1} + eI_0 \\ aI_{-4} + bx_{-3} + cI_{-2} + dx_{-1} + cI_0 + bx_1 + aI_2 \\ ax_{-3} + bI_{-2} + cx_{-1} + dI_0 + cx_1 + bI_2 + ax_3 \\ aI_{-2} + bx_{-1} + cI_0 + dx_1 + cI_2 + bx_3 + aI_4 \\ eI_0 + fx_1 + gI_2 + fx_3 + eI_4 \\ jI_2 + kx_3 + jI_4 \\ 0 \end{bmatrix}$$

This equation can be solved:

$$x_{-3} = \frac{F_{-3} - j(I_{-4} + I_{-2})}{k}$$

$$x_3 = \frac{F_3 - j(I_2 + I_4)}{k}$$

$$F_{-1} + F_1 = \left\{ \begin{array}{l} b(x_{-3} + x_3) + (b + d)(x_{-1} + x_1) + \\ a(I_{-4} + I_4) + (a + c)(I_{-2} + I_2) + 2cI_0 \end{array} \right\}$$

$$= \left\{ \begin{array}{l} \frac{b}{k}(F_{-3} + F_3 - j(I_{-4} + I_{-2} + I_2 + I_4)) + (b + d)(x_{-1} + x_1) + \\ a(I_{-4} + I_4) + (a + c)(I_{-2} + I_2) + 2cI_0 \end{array} \right\}$$

$$\Rightarrow (x_{-1} + x_1) = \frac{1}{b + d}\left\{ \begin{array}{l} F_{-1} + F_1 - \frac{b}{k}(F_{-3} + F_3 - j(I_{-4} + I_{-2} + I_2 + I_4)) - \\ a(I_{-4} + I_4) - (c + a)(I_{-2} + I_2) - 2cI_0 \end{array} \right\}$$

$$y_0 = a(x_{-3} + x_3) + b(I_{-2} + I_2) + c(x_{-1} + x_1) + dI_0$$

$$= \left\{ \begin{array}{l} \frac{a}{k}(F_{-3} + F_3 - j(I_{-4} + I_{-2} + I_2 + I_4)) + b(I_{-2} + I_2) + dI_0 \\ \frac{c}{b + d}\left\{ \begin{array}{l} F_{-1} + F_1 - \frac{b}{k}(F_{-3} + F_3 - j(I_{-4} + I_{-2} + I_2 + I_4)) - \\ a(I_{-4} + I_4) - (c + a)(I_{-2} + I_2) - 2cI_0 \end{array} \right\} \end{array} \right\}$$

$$= \frac{1}{(b + d)k}\begin{bmatrix} I_{-4} \\ F_{-3} \\ I_{-2} \\ F_{-1} \\ I_0 \\ F_1 \\ I_2 \\ F_3 \\ I_4 \end{bmatrix} \cdot \begin{bmatrix} cbj - ack - aj(b + d) \\ a(b + d) - cb \\ (bk - aj)(b + d) + cbj - ack - c^2k \\ ck \\ d(b + d)k - 2kc^2 \\ ck \\ (bk - aj)(b + d) + cbj - ack - c^2k \\ a(b + d) - cb \\ cbj - ack - aj(b + d) \end{bmatrix}$$

An example 70% 7-tap filter is:

$$vFilter7Tap70pcnt = \frac{1}{32768}\begin{bmatrix}-3766\\-8514\\12315\\32698\\12315\\-8514\\-3766\end{bmatrix} = \begin{bmatrix}a\\b\\c\\d\\c\\b\\a\end{bmatrix}$$

The example 5-tap filter defined above is:

$$vFilter5Tap70pcnt = \frac{1}{32768}\begin{bmatrix}-4006\\8486\\23808\\8486\\-4006\end{bmatrix} = \begin{bmatrix}e\\f\\g\\f\\e\end{bmatrix}$$

The example 3-tap filter defined above is:

$$vFilter3Tap70pcnt = \frac{1}{32768}\begin{bmatrix}5138\\22492\\5138\end{bmatrix} = \begin{bmatrix}j\\k\\j\end{bmatrix}$$

Hence the output pixel $y_0$ can be calculated using the following matrix:

$$y_0 = \frac{1}{32768}\begin{bmatrix}I_{-4}\\F_{-3}\\I_{-2}\\F_{-1}\\I_0\\F_1\\I_2\\F_3\\I_4\end{bmatrix} \cdot \begin{bmatrix}1787\\830\\-12997\\16686\\20156\\16686\\-12997\\830\\1787\end{bmatrix}$$

This equation is used on each spatially interpolated pixel. The response is a bandstop filter, with the stop band between 0.66 and 0.8 $f_s/2$; however, interpreting the response is complicated as it is only used for alternate output pixels.

FIG. 12a schematically illustrates the operation of the motion adaptive interpolator 110. The interpolator 110 comprises and inter-field block matcher 600, a high frequency checker 610 and a mixer 620.

The inter-field block matcher 600 uses data from the current input field and the three field stores 120 to carry out inter-field motion comparisons. This involves comparing blocks of pixels the current field ($F_N$ in FIG. 12b) with correspondingly positioned blocks in the previous field of the same type ($F_{N-2}$) and likewise comparing the preceding field ($F_{N-1}$) and the previous field of the same type ($F_{N-3}$). The results of these comparisons are used to detect a degree of motion in the image.

In particular, weighted sums of absolute differences (SWADs) are generated as follows.

Four block matches are performed to produce two weighted SADs. These are:

a 5h×4v weighted block match on fields $F_N$ and $F_{N-2}$.
a 5h×3v weighted block match on fields $F_{N-1}$ and $F_{N-3}$.
a 1h×1v weighted block match on fields $F_{N-1}$ and $F_{N-3}$.
a 1h×2v weighted block match on fields $F_N$ and $F_{N-2}$.

Weighted block matches sum weighted absolute differences between coincident pixels, SWAD.

$$SWAD = \sum_{dx=-2}^{2}\sum_{dy=2,0,2}\sum_{RGB/YCbCr} w(dx,dy)|F_{N-1}(dx,dy) - F_{N-3}(dx,dy)|$$

where $F_{N-1}(dx,dy)$ is the value at the frame-relative position $dx, dy$ to the current pixel. Example values of w can be found in the Appendix.

Summing the first two SWADs gives an area-based block match, $SWAD_{AREA}$

Summing the latter two SWADs gives a localised block match, $SWAD_{LOCAL}$

All three colour components contribute to the SWADs in the same manner. The system need only maintain a SAD of the three components for each pixel, which is then weighted and combined with the values from the other pixels in the block. This means that this aspect of the process requires only 5 line stores of about 10 bpp (bits per pixel).

The high frequency checker 610 is arranged to detect high frequencies in the input fields. The algorithm is based on the following principle.

If interleaving the two source fields produces a lot of high frequency energy, then it is appropriate to try to make sure that the inputs are reasonably static. Only static video can produce reliable high frequencies; highly aliased motion can produce high frequencies, but this is not a desirable situation for inter-field interpolation. If motion is present, then high frequencies may be produced where the fields are incorrectly interleaved.

Referring to FIG. 13, the high frequency checker uses the lines above and below the currently interpolated pixel from the current field $F_N$ and the line from the preceding field $F_{N-1}$ that corresponds to the missing line. The HFC may be considered as a 5×3 pixel neighbourhood check.

Let $HFC_{thresh1}$ and $HFC_{thresh2}$ be two programmable constants, with the former greater than the latter.

Set a flag: exceededHighEnergy=false

Over each component (or a subset of them) (RGB/YPbPr)—where YPbPr indicate the colour space in a high definition system, in a similar way to YCbCr in a standard definition system:

Set energy=0

For the pixels having a horizontal position x=−2,−1,0,1,2 (relative to the current pixel), let the interleaved field value be $v_0$, and the current field value of the line above and below be $v_{-1}$ and $v_1$, then:

if $v_0<\min(v_1,v_{-1})$, set diff=min(v1,v−1)−v0
else if v0>max(v1,v−1), set diff=v0−max(v1,v−1)
else set diff=0
If (diff>$HFC_{thresh1}$), set energy=energy+($HFC_{thresh1}$−$HFC_{thresh2}$)*weighting[x]
else if (diff>$HFC_{thresh2}$), set energy=energy+(diff−$HFC_{thresh2}$)*weighting[x]
If energy>$HFC_{allowance}$, set flag exceededHighEnergy=true This ends the processing carried out over each component.

Subsequently, if exceededHighEnergy=true, increase $SWAD_{AREA}$ by a programmable constant value, $HFC_{penalty}$.

The increase in $SWAD_{AREA}$ will tend to act against the use of the motion adaptive pixel at that output position.

The mixer 620 operates according to the criteria $SWAD_{AREA}$ and $SWAD_{LOCAL}$ and also various thresholds $thresh_1$ . . .

If $SWAD_{LOCAL} > thresh_1$, use only spatially interpolated field, $F_{N'}$

Else if $SWAD_{AREA} > thresh_2$, use only spatially interpolated field, FN', only Else if $SWAD_{AREA} < thresh_3$, use only field $F_{N-1}$ Else mix field FN-1 and FN':

let $a = (thresh_2 - SWAD_{AREA})/(thresh_2 - thresh_3)$

The resulting pixel value=$a\, F_{N-1} + (1-a) F_{N'}$

FIGS. 14a and 14b schematically illustrates a variation which reduces the need for image scaling. In particular, FIG. 14a schematically illustrates the operation of embodiment described above, where each row of pixels (indicated in this diagram as □○□○ . . . contains real pixels and 1:2 interpolated pixels from the scaler 130. An example block match between two blocks 700, 710 and another between two blocks 720, 730 is illustrated.

In common between the two block matches in FIG. 14a is the fact that the extreme edge pixels of the blocks are 1:2 interpolated pixels ○. Therefore, this method relies on the whole image having been scaled by the 1:2 scaler.

In FIG. 14b, the blocks are changed in size very slightly so that the extreme edge pixels are real rather than interpolated pixels. In the upper part of FIG. 14b, the same image feature angle is tested as in the upper part of FIG. 14a, but the blocks 740, 750 are made slightly wider so that their edge pixels are real pixels □. Similar considerations apply to the lower part of FIG. 14b, which shows a match between blocks 760, 770 which tests the same image feature angle as the match shown in the lower part of FIG. 14a.

It is then the case that the comparisons between pairs of interpolated pixels are not actually needed for large blocks such as those shown in FIGS. 14a and 14b. The same information can be obtained from a basic comparison of the real (non-interpolate) pixels. Recall, however, that the original reason why the pixel interpolation was introduced was to allow for steep (near vertical) image feature angles to be detected. Therefore, in one arrangement, the present embodiment retains the 1:2 interpolation operation for smaller block offsets, in order to allow such steep angles to be better detected. For example, a range of block offsets of ±1 and 0 could use 1:2 interpolated pixels, whereas block offsets of greater than this need not use the 1:2 interpolated pixels.

In a further variation, each block size is used in a match operation for only its most positive and most negative offsets. This can dramatically reduce the number of block matching operations needed, while not actually losing any information, since the previous scheme repeated (for example) the block matching tests at zero displacement (vertical image feature) for each block size.

Taken together, these measures can allow the 1:2 interpolation to be carried out "as required", i.e. a block of 1:2 pixels being processed separately in response to a pixel within that subset being included within a test block to be tested by the block comparator, for example within the block matcher, rather than as a whole field of interpolated pixels by the scaler 130. This reduces the need for a field store to hold the field of interpolated pixels. Instead, just a few interpolated pixels over a few lines need to be buffered by the block matcher.

FIGS. 15, 16a, 16b, 17a and 17b schematically illustrate a primary and an alternative pixel testing strategy.

A further alternative to the arrangement described above is another alteration to alter the rules applicable to block matching in order to reduce the hardware requirements of this operation.

The original equation for horizontal energy, described above, was:

$$\left( \sum_{i=2}^{blockWidth} |x_i - x_{i-1}| \right) - |x_{blockWidth} - x_1|$$

where x referred to the centre row of the block. This can be replaced by the equation:

$$\sum_{y=-1}^{0} \left( \left\{ \sum_{i=2}^{blockWidth} |x(i, y) - x(i-1, y)| \right\} - |x(blockWidth, y) - x(1, y)| \right)$$

Figure 16A:
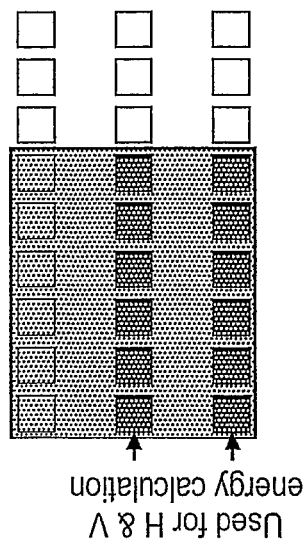
Figure 17A:
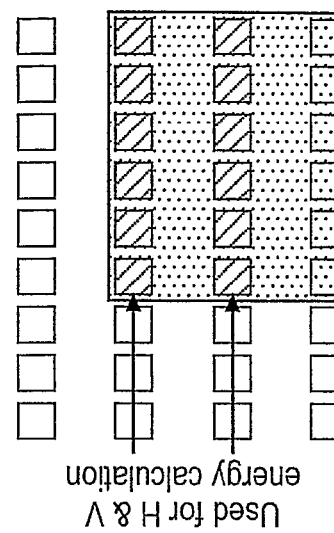
Figure 16B:
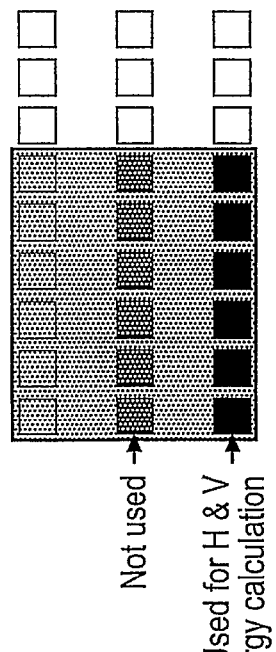
Figure 17B:
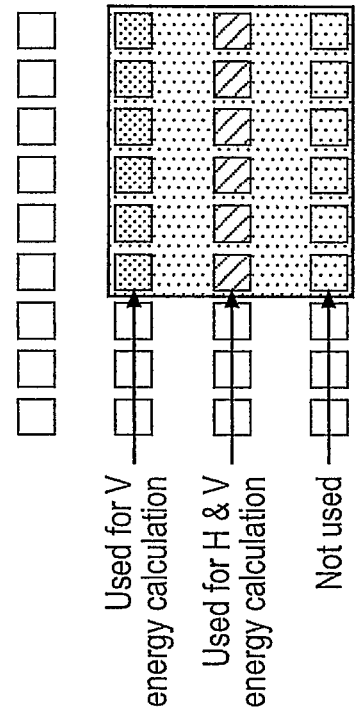
Figure 15:
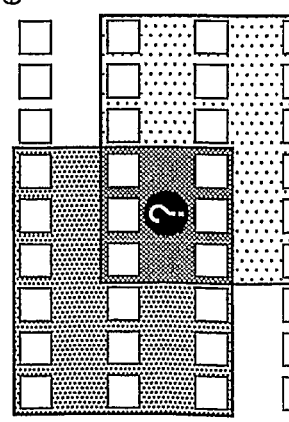

The revised test is symmetrical about the interpolated row. FIG. 15 schematically illustrates a block match. FIGS. 16a and 16b schematically illustrate the original test for horizontal and vertical energy which would have been performed in respect of that block match. FIGS. 17a and 17b schematically illustrate the revised tests which show that the same two rows are used for both tests.

This means that the same logic can carry out both tests, leading to a reduction in the hardware required to implement this rule.

Finally, FIG. 18 schematically illustrates the generation of a difference value. With the arrangement of FIG. 18, SAD values are calculated as a rolling average, with a new value being inserted and an old one discarded. This again can cut down the processing and hardware required to implement this feature.

Although the embodiments have been described in respect of interlace to progressive scan conversion, the same techniques could be applicable to altering the size (e.g. height) of an image such as a progressive scan image. For example, the techniques could perform a 1:3 or 1:4 scaling.

It will be appreciated that the invention can be implemented in programmable or semi-programmable hardware operating under the control of appropriate software. This could be a general purpose computer or arrangements such as an ASIC (application specific integrated circuit) or an FPGA (field programmable gate array). The software could be supplied on a storage medium such as a disk or solid state memory, or via a transmission medium such as a network or internet connection, or via combinations of these.

Appendix

Some example parameters:

|  | YPbPr setting | RGB setting |
| --- | --- | --- |
| C1 | −128 | −300 |
| C2 | 0 | 3 |
| $KFC_{Thresh}$ | 31 | 41 |
| C3 | 8 | 8 |
| C4 | 3 | 3 |
| C5 | 2 | 2 |
| C6 | 1 | 1 |
| C8 | 64 | 512 |

-continued

|  | YPbPr setting | RGB setting |
|---|---|---|
| HFC weighting | [2 4 5 4 2] | [2 4 5 4 2] |
| $HFC_{thresh1}$ | 40 | 40 |
| $HFC_{thresh2}$ | 8 | 8 |
| $HFC_{allowance}$ | 218 | 128 |
| $HFC_{penalty}$ | 10 | 25 |
| thresh1 | 60 | 120 |
| thresh2 | 20 | 50 |
| thresh3 | 25 | 60 |

The invention claimed is:

1. Image processing apparatus in which pixels of an output image are generated from groups of one or more pixels of an input image, the groups being selected in accordance with an image feature direction in the input image, the apparatus comprising:

an interpolator configured to interpolate intermediate pixels between pixels of the input image; and a block comparator configured to detect correlation between sets of test blocks of pixels in the input image, the sets of test blocks being oriented with respect to a current pixel position so that the orientation of a set having the greatest correlation indicates a probable image feature direction applicable to the current pixel position, wherein, for a set of test blocks associated with an image feature angle with respect to the current pixel position within a predetermined range around a vertical orientation, the test blocks include pixels of the input image and intermediate pixels interpolated from pixels of the input image; and for a set of test blocks associated with an image feature angle with respect to the current pixel position outside the predetermined range around the vertical orientation, the test blocks include only pixels of the input image.

2. Apparatus according to claim 1, in which for all sets of test blocks which have an orientation with respect to the current pixel position within the predetermined range around the vertical orientation, the test blocks include pixels of the input image and intermediate pixels interpolated from pixels of the input image.

3. Apparatus according to claim 1, in which the interpolator is configured to interpolate the intermediate pixels in respect of subsets of pixels of the input image, each subset being processed separately in response to a pixel within that subset being included within a test block to be tested by the block comparator.

4. Apparatus according to claim 3, in which each subset comprises one test block of pixels.

5. Apparatus according to claim 1, in which the size of the test blocks generally increases with increasing angular displacement from the vertical orientation.

6. Vision mixing apparatus comprising image processing apparatus according to claim 1.

7. Video display apparatus comprising image processing apparatus according to claim 1.

8. An image processing method in which pixels of an output image are generated from groups of one or more pixels of an input image, the groups being selected in accordance with an image feature direction in the input image, the method comprising the steps of:

interpolating intermediate pixels between pixels of the input image; and detecting correlations between sets of test blocks of pixels in the input image, the sets of test blocks being oriented with respect to a current pixel position so that the orientation of a set having the greatest correlation indicates a probable image feature direction applicable to the current pixel position, wherein, for a set of test blocks associated with an image feature angle with respect to the current pixel position within a predetermined range around a vertical orientation, the test blocks include pixels of the input image and intermediate pixels interpolated from pixels of the input image; and for a set of test blocks associated with an image feature angle with respect to the current pixel position outside the predetermined range around the vertical orientation, the test blocks include only pixels of the input image.

9. A non-transitory computer readable storage medium having stored thereon computer software having program code which, when executed by a computer, is arranged to cause the computer to carry out the method according to claim 8.

* * * * *